June 18, 1929.                P. EIMLER                1,717,766
     METHOD OF AND APPARATUS FOR CONNECTING THE PARTS
            OF FRACTURED BONES WITH EACH OTHER
                    Filed Feb. 23, 1928
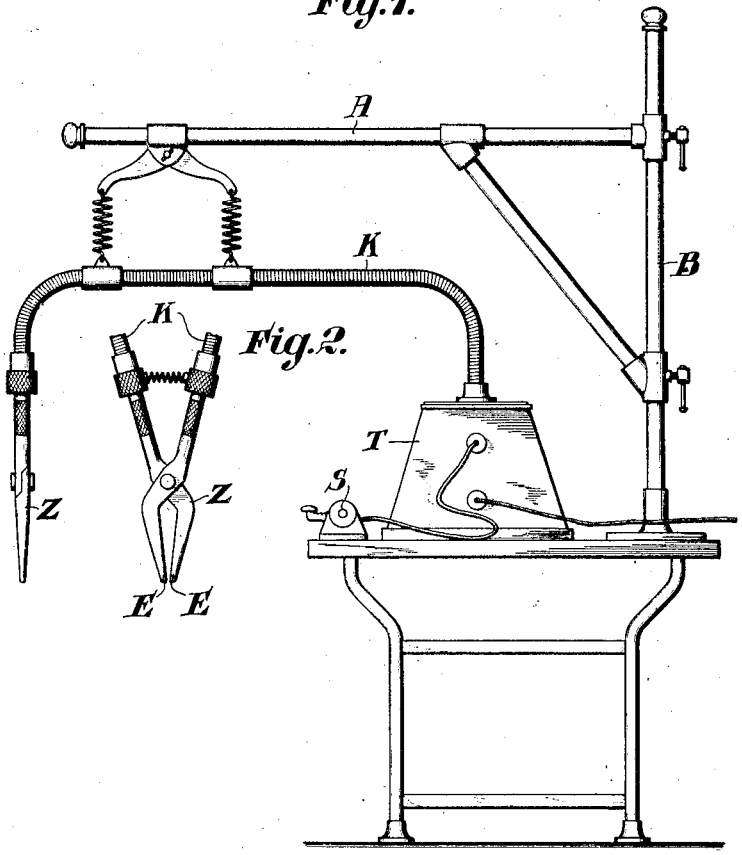
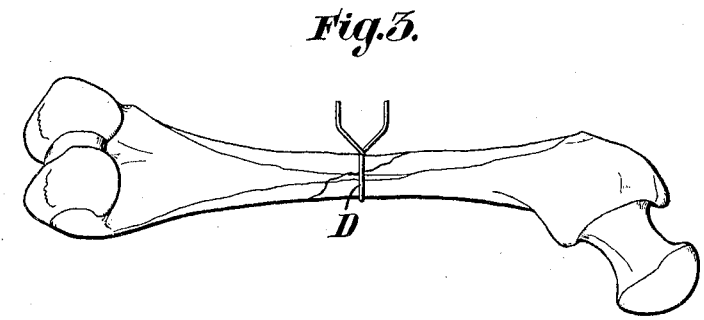
P. Eimler
  INVENTOR
By Marks & Clerk
         ATTYS.

Patented June 18, 1929.

1,717,766

UNITED STATES PATENT OFFICE.

PAUL EIMLER, OF WAIDMANNSLUST, NEAR BERLIN, GERMANY, ASSIGNOR OF ONE-HALF TO MORITZ BORCHARDT, OF BERLIN, GERMANY.

METHOD OF AND APPARATUS FOR CONNECTING THE PARTS OF FRACTURED BONES WITH EACH OTHER.

Application filed February 23, 1928, Serial No. 256,404, and in Germany February 24, 1927.

This invention relates in the first place to a method of connecting the parts of fractured bones with each other, and in the second place to an apparatus for carrying this method into practice. Of late, the parts of fractured bones have more and more been connected with each other by means of wire, especially silver wire, but this material has not proved suitable for that purpose in that it is corroded by chemical actions taking place between it and the circulating blood, in consequence whereof the originally strong connection becomes gradually weaker prior to the complete healing of the fracture. In view thereof steel-wire, especially rust-proof steel-wire, is now being used instead of the silver-wire, but the general use of other material is impeded, or has been impeded, prior to the present invention, by the circumstance that no suitable manner of connecting the wire-ends with one another was known, which is also true of the silver-wire. A connection by screws has been tried but has proved to be very defective, and also a soldering connection has not proved useful in that it gave rise to local electrolytic actions by which the wire loop was rendered loose.

All drawbacks of all methods hitherto employed have now been overcome by the present improved method, according to which electric resistance welding is used for connecting the wire-ends with each other and connecting thereby the wire loop or loops very securely and permanently reliably with the parts of the fractured bone. But to carry this new method into practice it has been necessary to provide new means particularly designed for the purpose in view, viz rendering possible electric resistance heating without doing any damage to the fractured bone. One of the members pertaining to the arrangement and combination of the parts which in their entirety constitute the apparatus consists of a quick-break switch adjustable to time by which a very accurate pre-determination of the welding time is rendered possible, in such a manner, that the welding heat cannot pass in that time to sensitive portions of the fractured bone. Another important feature resides therein that the welding place and the transformer are separated from each other, in that the accessibility of the welding place proper at the wire loop is very restricted, and from this reason the welding tool proper has been designed as pliers connected with the transformer by means of balanced cables. That separation of the transformer, the quick-action switch and the welding tool is necessary also with consideration to the high voltage of the welding current.

The apparatus for carrying the method into practice is illustrated diagrammatically and by way of example on the accompanying drawing on which Figure 1 is a side-view of the complete apparatus, Figure 2 a separate view of the welding tool, and Figure 3 a representation of a fractured bone with a wire-loop around the bone portions at the fracture.

On the drawing, T (Fig. 1) denotes a casing in which the resistance welding transformer is housed, K is one of the cables (of which there are two, as appears from Fig. 2), Z is the welding tool in the form of pliers, and E are the electrodes located at the free ends of the plier jaws. The tool E is suspended from a horizontally and vertically adjustable arm A held by a standard B, whereby it is rendered possible to adjust the tool very accurately and easily with respect to the place where the fractured bone is to be treated. S denotes the quick-action switch which can be adjusted to a definite closing time of the primary current, and can be manually released.

The manner of operation is this: After the parts of the broken bone have been put together in their proper position with respect to one another and the steel-wire loop D (Fig. 3) has been placed around the assembled bone parts, the wire ends are grasped between the electrodes E of the welding tool Z and the switch S is closed whereby the primary current is closed for the pre-determined length of time, in consequence whereof a correspondingly long or, more precisely, short rush of current of great strength, but low voltage (about 2–3 volts), arises in the secondary wire. The time amounts, in fact, only to a fraction of a second (1/20–1/10 second), but this is sufficient to heat the wire ends to welding heat and weld them perfectly securely together by means of the tool Z or, more precisely, its electrodes E. These latter consist of copper, and their mass is big in proportion to the mass of the wire, and as they remain for a while, after the welding, in contact with the wire they abstract immediately the welding heat preventing this latter, therefore, from getting access to the bone skin.

Practical tests with the apparatus have proved unquestionably that even very heat-sensitive parts near the fracture remain absolutely unimpaired, and as the wire ends are connected solely by their own material no detrimental local electrolytic effects can arise. The connection proceeds very quickly and its strength is by far greater than with any other of the known connecting methods, so that a perfectly secure and unobjectionably reliable connection of the bone parts is attained.

I claim:

The method of connecting the parts of a fractured bone with each other, consisting in connecting the bone parts with each other by a wire of a weldable material, connecting the wire ends with each other first mechanically and then electrically by means of momentary electric resistance heating between electrodes, the mass of which is essentially larger than the mass of the wire ends, and which remain in contact with the latter after the welding so that the welding heat is instantaneously abstracted by them, substantially as set forth.

In testimony whereof I affix my signature.

PAUL EIMLER.